United States Patent [19]

Fultz

[11] Patent Number: 4,717,864
[45] Date of Patent: Jan. 5, 1988

[54] SPEED CONTROL METHOD AND APPARATUS FOR ELECTRONICALLY COMMUTATED MOTORS

[75] Inventor: Jack V. Fultz, Thousand Oaks, Calif.

[73] Assignee: Pertec Peripherals Corporation, Chatsworth, Calif.

[21] Appl. No.: 752,400

[22] Filed: Jul. 5, 1985

[51] Int. Cl.$^4$ .............................. H02P 6/02
[52] U.S. Cl. .................... 318/254; 318/138; 318/313; 318/315; 318/318; 318/480
[58] Field of Search ............. 318/138, 254, 439, 313, 318/315, 318, 326, 327, 329, 480

[56] References Cited

U.S. PATENT DOCUMENTS

| | | | |
|---|---|---|---|
| 3,663,877 | 5/1972 | Clark | 318/326 |
| 3,831,073 | 8/1974 | Tanikoshi | 318/254 A |
| 3,896,357 | 7/1975 | Tanikoshi | 318/254 A |
| 4,197,489 | 4/1980 | Dunn et al. | 318/138 |
| 4,258,299 | 3/1981 | Takeda et al. | 318/254 |
| 4,507,591 | 3/1985 | Kelleher | 318/254 |
| 4,510,422 | 4/1985 | Ogura | 363/49 X |
| 4,525,657 | 6/1985 | Nakase et al. | 318/313 X |
| 4,543,516 | 9/1985 | Kobori et al. | 318/326 X |

Primary Examiner—William M. Shoop, Jr.
Assistant Examiner—Bentsu Ro
Attorney, Agent, or Firm—Freilich, Hornbaker, Rosen & Fernandez

[57] ABSTRACT

A speed control system for an electronically commutated motor having stator windings, a rotor mounted for rotation relative to said windings, switches for individually energizing said windings, and phase steering means operable to close said switches to sequentially energize said windings. The control system includes means responsive to a rotational position of said rotor for initiating a speed measurement cycle, means for measuring rotor speed during each speed measurement cycle and for comparing the measured speed with a speed set-point, and means responsive to the rotor speed being less than said set-point for enabling said phase steering means to energize said windings.

14 Claims, 11 Drawing Figures

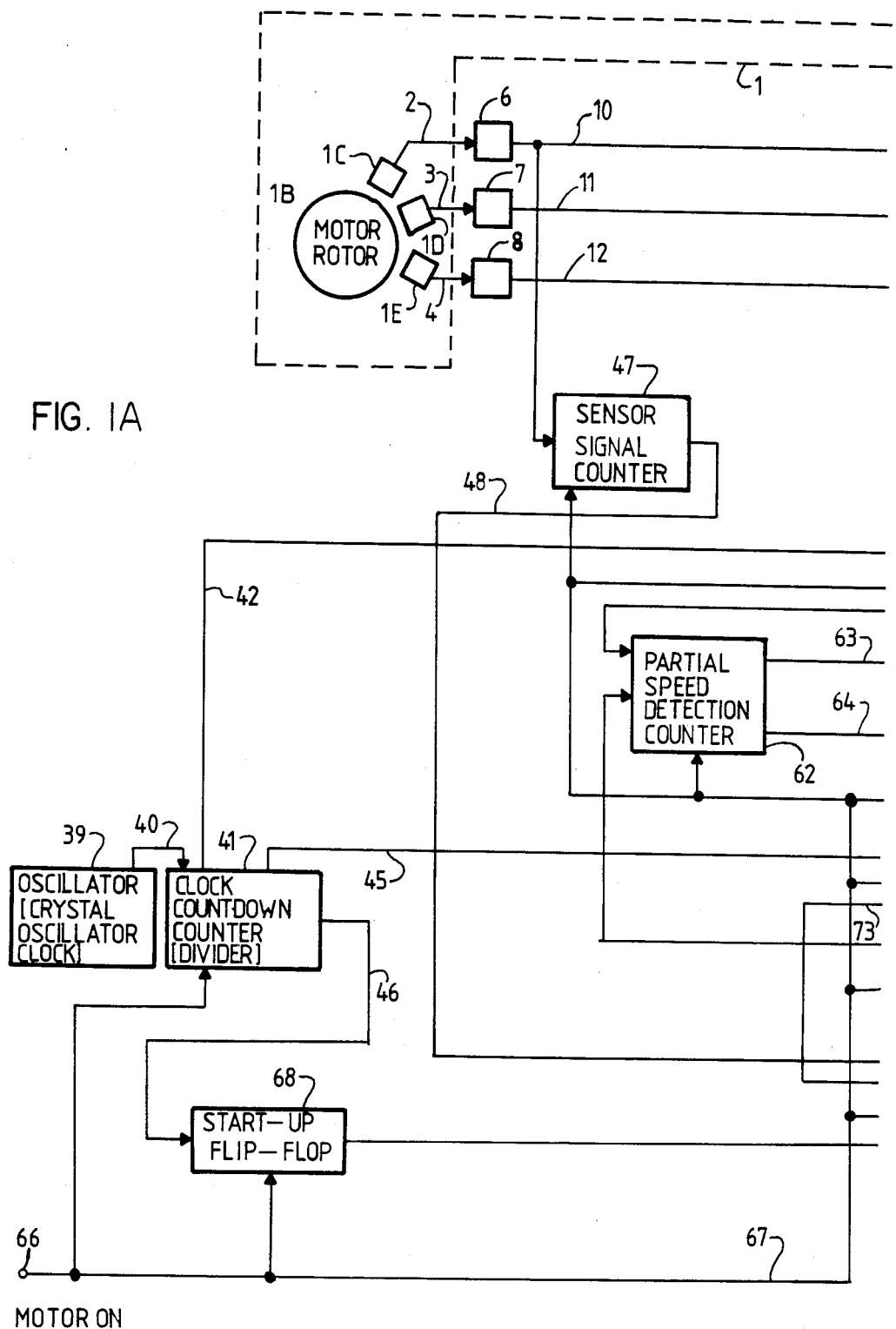
FIG. IA

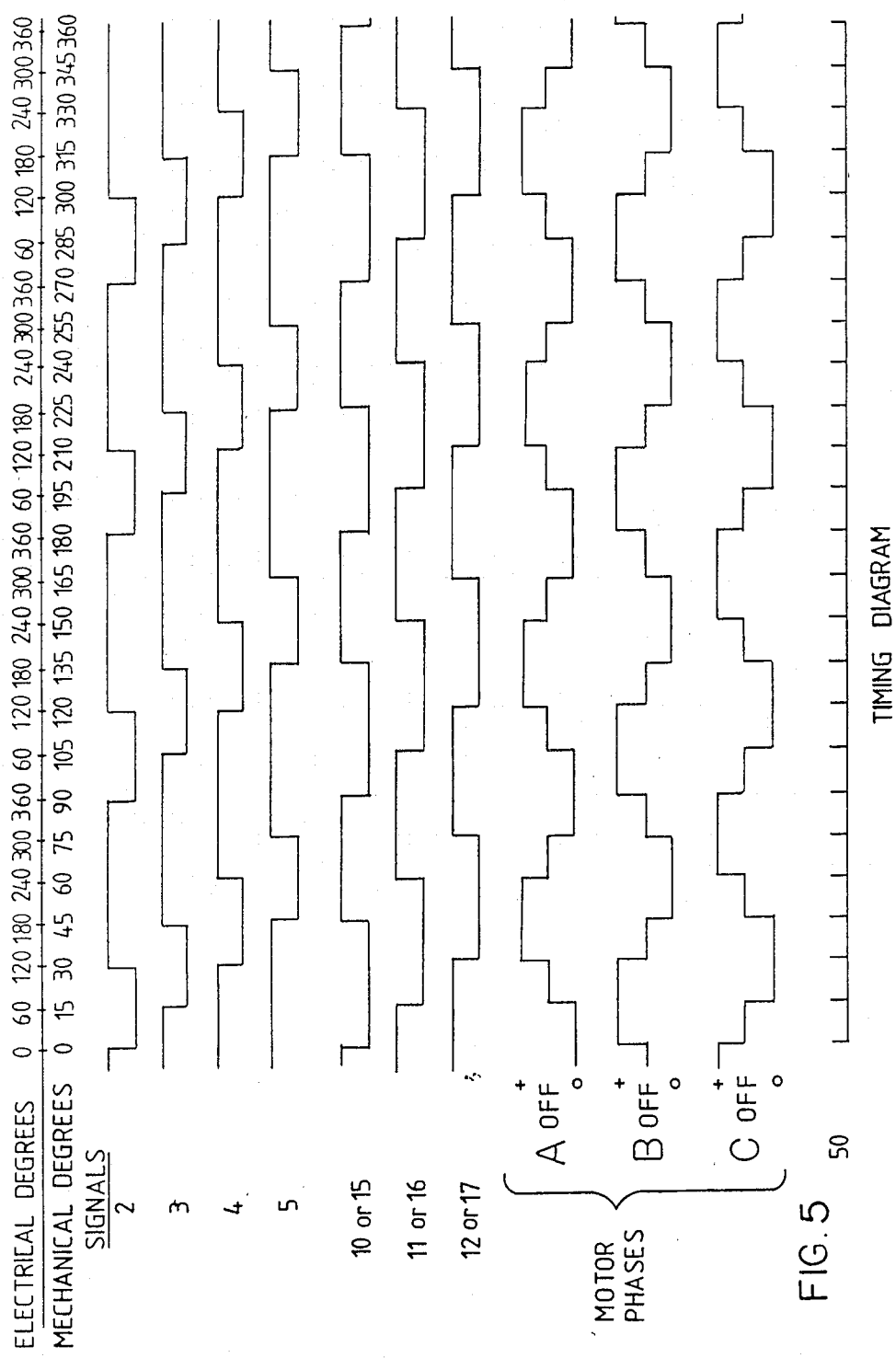

1

SPEED CONTROL METHOD AND APPARATUS FOR ELECTRONICALLY COMMUTATED MOTORS

BACKGROUND OF THE INVENTION

This invention relates generally to a method and apparatus for controlling the speed of electronically commutated motors and is particularly useful for controlling motors used to drive digital disk storage devices.

The prior art is replete with various systems for controlling the rotor speed of electronically commutated motors. One frequently used method is to control the voltage drop across a regulating element connected in series with the motor windings to thus vary the effective voltage applied across the motor windings. The regulating element can be operated either in a linear mode or in a pulse mode by means of pulse-width or pulse-frequency modulation. The pulse mode provides a time average voltage drop across the regulating element that determines the effective voltage made available to the motor windings.

SUMMARY OF THE INVENTION

The present invention is directed to an improved method and apparatus for exercising closed loop control of rotor speed of electronically commutated motors (including motors sometimes referred to as brushless DC motors). More specifically, the invention is directed to an improved control system for detecting instantaneous rotor speed and position and for selectively increasing rotor speed by energizing the motor windings at times, and for intervals, optimized for the detected speed and position of said rotor.

In accordance with an important aspect of the invention, the motor windings are energized by controlling switching elements in a manner to minimize switching transitions and thereby minimize switching losses and the generation of undesired electro-magnetic interference.

In accordance with a preferred embodiment of the invention, the control system operates the switching elements normally used to commutate the motor windings without requiring the use of expensive series connected regulating elements. As a consequence, embodiments of the invention posses favorable cost, complexity, and power dissipation characteristics as compared to prior art systems utilizing series regulating elements.

In accordance with a further aspect of the preferred embodiment, the control system is comprised almost entirely with digital circuitry thereby permitting the system to be implemented using a single integrated circuit package.

In accordance with a feature of an alternative embodiment of the invention, the system can be selectively operated in either a first (coarse) or second (fine) speed sensing mode and mode changes can be made without loss of control or the generation of undesired switching transients.

The novel features of the invention are set forth with particularlty in the claim. The invention will best be understood from the following description when read in conjunction with the accompanying drawing.

BRIEF DESCRIPTION OF THE DRAWING

FIG. 5 is a timing diagram depicting certain significant signal waveforms characteristic of the operation of the control system embodiments of FIGS. 1–4;

DESCRIPTION OF EXEMPLARY EMBODIMENTS

Figure 1B:
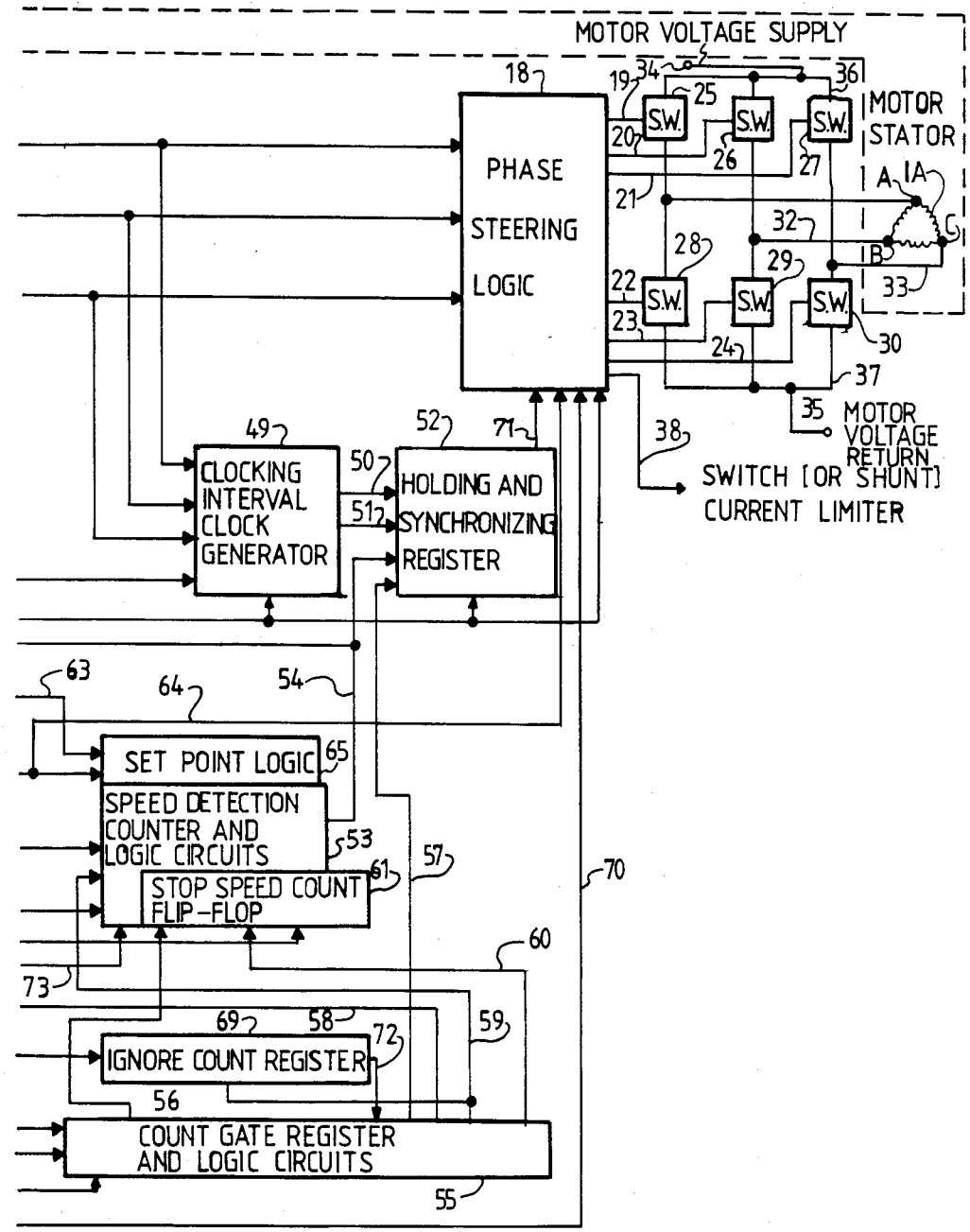
FIG. 1 (comprised of left half FIG. 1A and right half FIG. 1B) is a block diagram depicting a basic control system embodiment in accordance with the present invention.
Figure 2B:
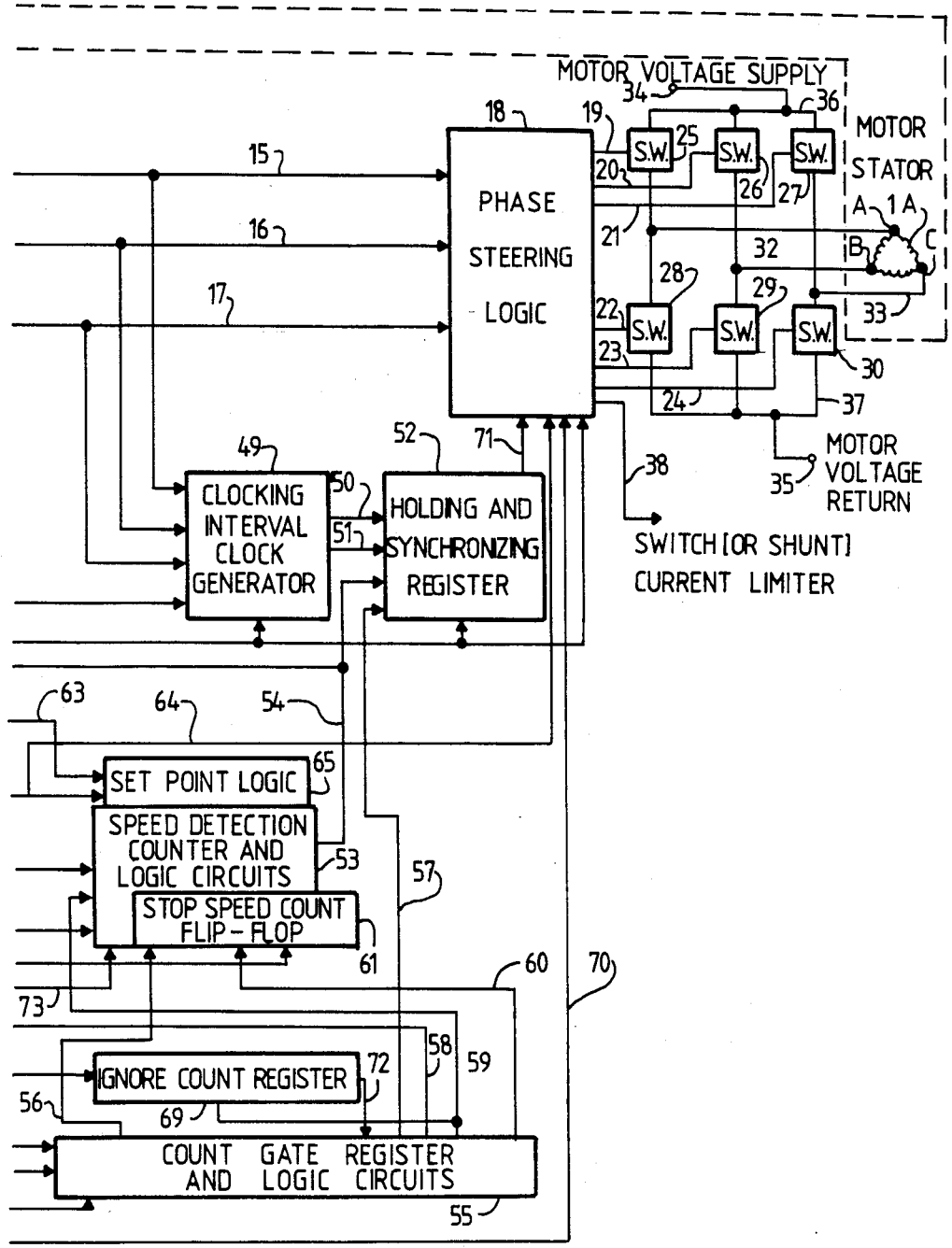
FIG. 2 (comprised of left half FIG. 2A and right half FIG. 2B) is a block diagram depicting a first alternative control system embodiment which differs from the embodiment of FIG. 1 in that four, rather than three, rotor sensors are used.
Figure 2A:
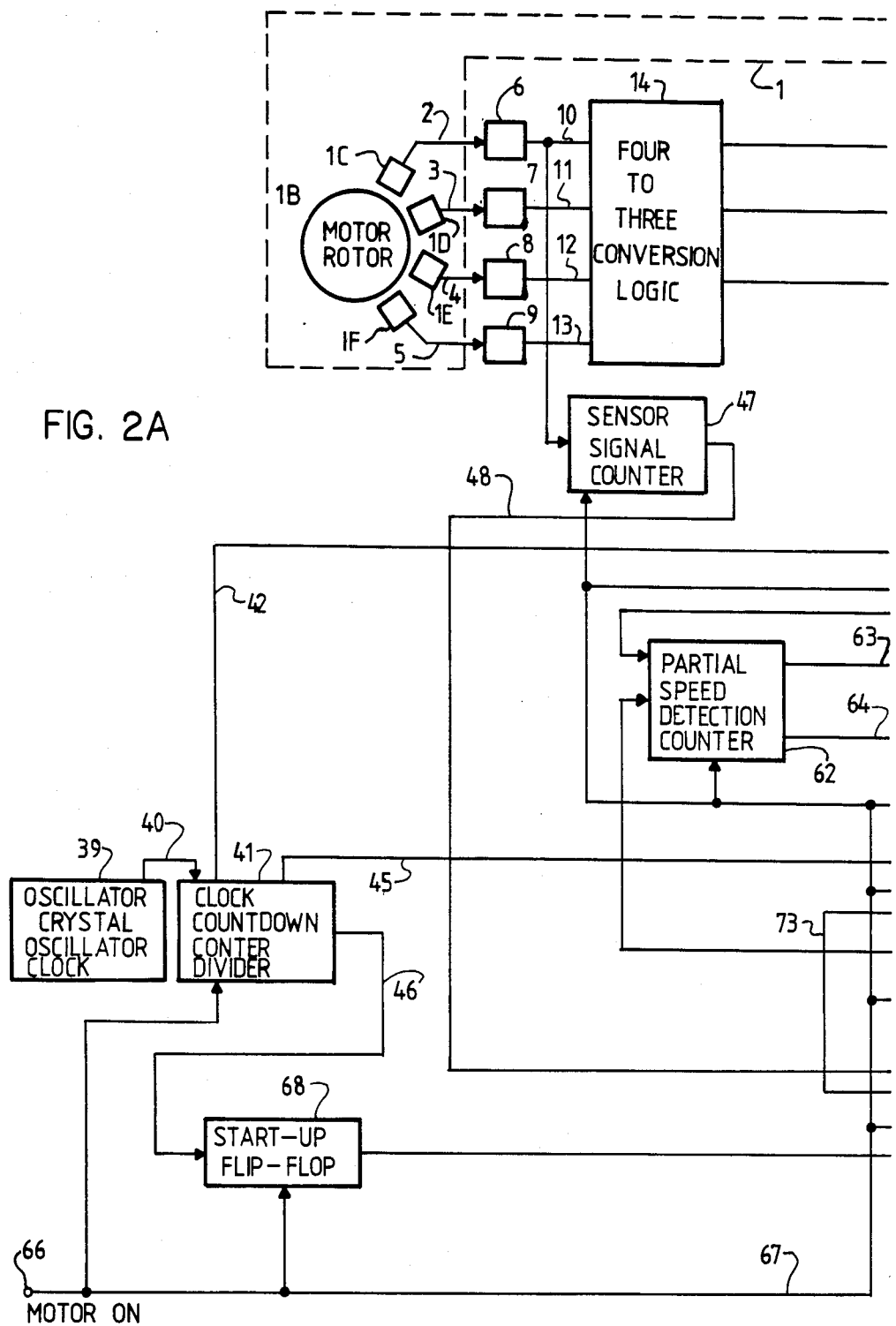
Figure 3A:
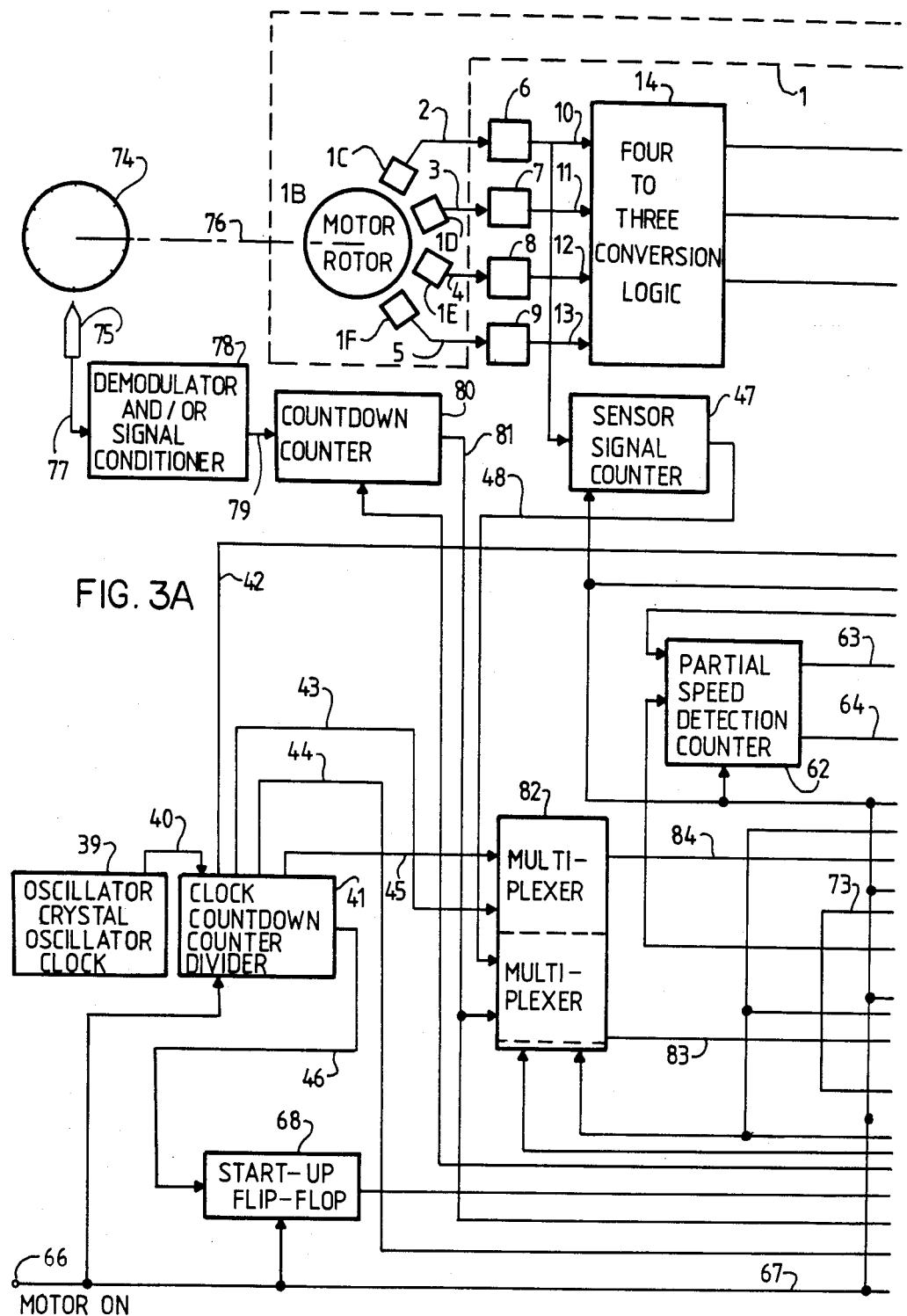
FIG. 3 (comprised of left half FIG. 3A and right half FIG. 3B); is a block diagram depicting a second alternative control system embodiment which differs from the control system of FIG. 2 in that it provides for two different modes of speed sensing.
Figure 3B:
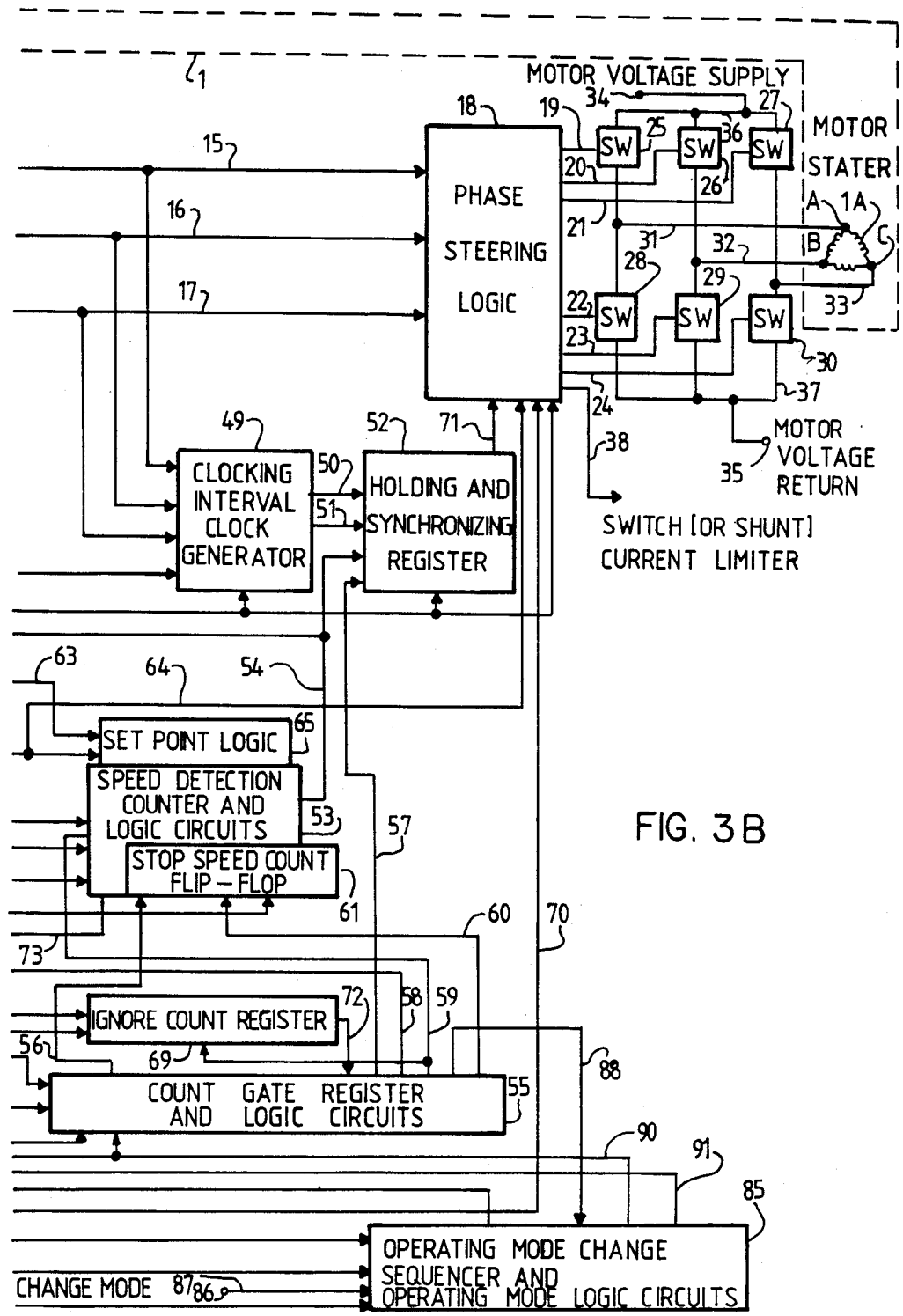
Figure 4A:
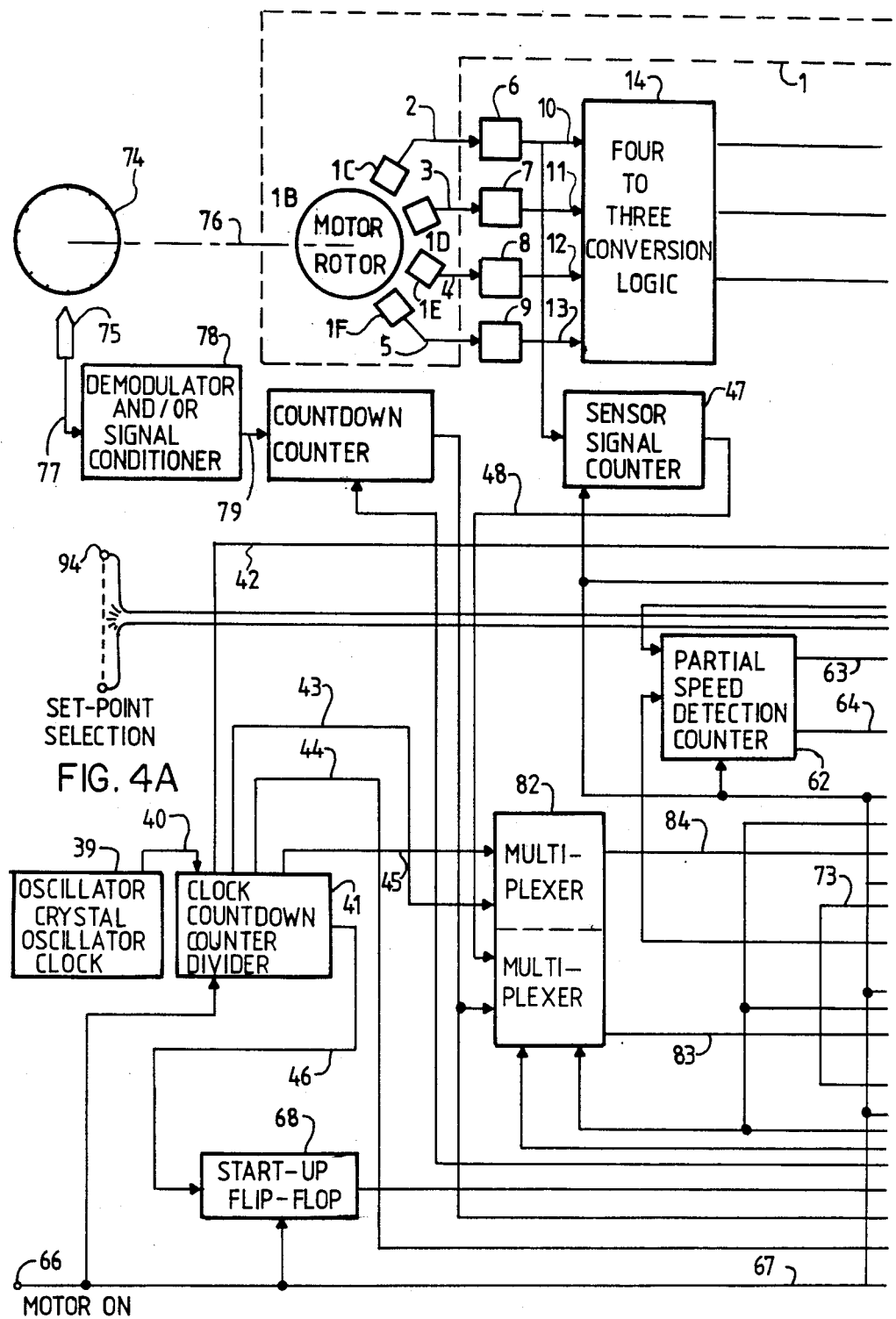
FIG. 4 (comprised of left half FIG. 4A and right half FIG. 4B) is a block diagram depicting a third alternative control system embodiment which differs from the control system of FIG. 3 primarily in that it includes means for selectively establishing a set-point.
Figure 4B:
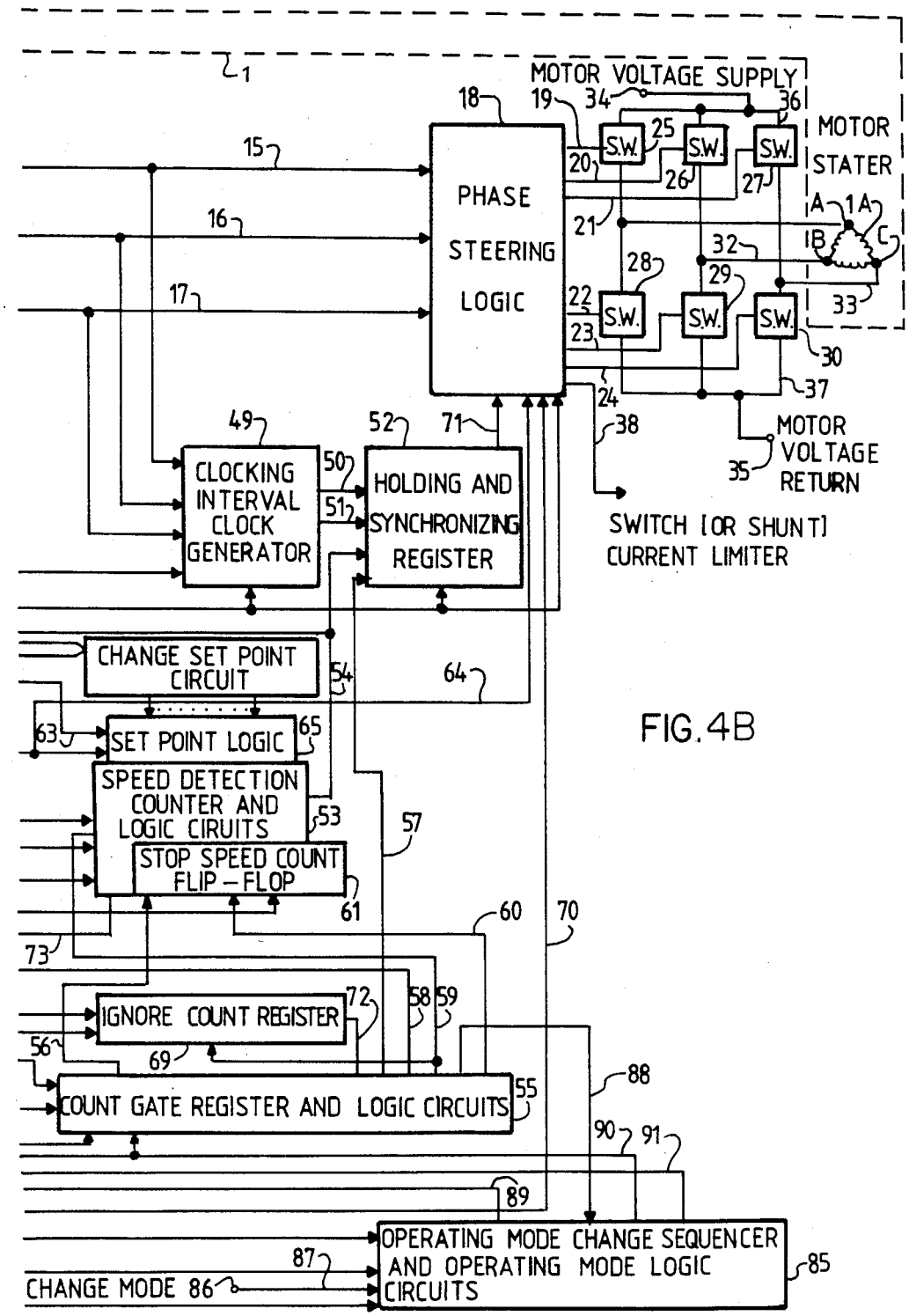

FIGS. 1, 2, 3 and 4, depict an exemplary motor 1 suitable for electronic commutation and comprised of stator windings 1A, a rotor 1B and rotor sensors 1C, 1D, 1E (FIGS. 1–4) and 1F (FIGS. 2–4).

The stator winding 1A is shown as a three-phase delta connected winding, which is normally fixedly mounted within the motor.

The rotor 1B is normally mounted on a shaft and allowed to rotate with respect to the stator 1A. The rotor typically carries permanent magnets, and the fields of these magnets interact with the fields of the stator that are created by passing currents through the stator windings. Due to the interaction of the stator and rotor fields, a net torque is produced, resulting in rotation of the rotor, if the windings are commutated (energized) at the proper angular positions of the rotor.

Sensors 1C, 1D, 1E and 1F function to detect the instantaneous angular position of the rotor and generates timing waveforms indicative of said angular position. This arrangement is well known in the art various types of sensors such as opto-electronic, Hall Effect, and others can be used.

The number of rotor sensors utilized typically depends on the type of sensor, the number of motor phases, and the design of that portion of the rotor that relates to the position sensing function. By way of example, an eight-pole three-phase motor having eight magnets of short arc-length within the rotor could most conveniently utilize four Hall Effect devices for rotor position sensing. The situation of four sensors is illustrated in FIGS. 2, 3 and 4. By way of another example a common arrangement of a four-pole three-phase motor having only four magnets within the rotor could most conveniently utilize three Hall Effect devices for rotor position sensing. The situation of three sensors is illustrated in FIG. 1.

The sensors 1C, 1D, 1E and 1F furnish output signals 2, 3, 4 and 5 respectively which are fed as inputs to signal conditioning circuits 6, 7, 8 and 9 respectively. The objective and function of the signal conditioning circuits 6, 7, 8 and 9 is to produce output signals, 10, 11, 12 and 13, respectively, relatively free from undesired noise but with rise and fall times sufficiently small that the digital circuits that utilize those signals will operate properly.

The configuration chosen for the signal conditioning circuits 6, 7, 8, 9 depends on the type of sensors utilized, the desired rise and fall times of the signals output from the signal conditioning circuits, extraneous noise (if any) riding on the sensor output signals, and various other considerations such as the extent of any undesired crosstalk between the motor windings and the sensors. To better understand the possible configurations, three different examples will be discussed.

By way of first example, the signal conditioning circuits 6, 7, 8, 9 might be comprised of a low pass filter followed by a schmitt trigger. The low pass filter would serve the function of essentially filtering out the noise and spikes riding on the sensor signals 2, 3, 4, 5 which could be induced by undesired crosstalk between the motor windings 1A and the sensors. The Schmitt trigger serves to shape the waveform to make it compatible with digital logic levels as well as improving the rise and fall times sufficiently.

By way of a second example, the low pass filter could be deleted if the noise and crosstalk riding on the sensor signal is negligible or is controlled by other means such as shielding.

By way of a third example, it is sometimes advantageous to utilize a sensor circuit which includes an integrated first Schmitt trigger together with a signal conditioning circuit comprised of a low pass filter followed by a second Schmitt trigger. In this arrangement, the first Schmitt trigger provides initial waveshaping and a robust digital signal. The low pass filter serves to filter out any extraneous noise and spikes and the second Schmitt trigger serves to shape the waveform to make it compatible with digital logic levels and shorten the rise and fall times.

The signal conditioning circuit output signals 10, 11, 12 and 13 (FIGS. 2-4) are applied as inputs to the four-to-three conversion logic 14 which functions to convert the waveforms of signals 10, 11, 12 and 13 to waveforms indicating the rotor position which may be transmitted as three signals 15, 16, and 17. Logic 14 implements logical AND's of signals 10 and 11, signals 11 and 12, and signals 12 and 13 to respectively produce signals 15, 16, and 17. The signals 15, 16 and 17 are applied as inputs to the phase steering logic 18 as depicted in FIGS. 2, 3 and 4.

In the situation where only three sensors are utilized, then the signals 10, 11 and 12 are applied directly as inputs to the phase steering logic 18 as illustrated in FIG. 1.

The phase steering logic 18 is implemented with logic gates and provides digital output signals 19, 20, 21, 22, 23 and 24 to selectively enable the power switches 25, 26, 27, 28, 29 and 30 respectively, thus controlling the conduction time of the power switches and the commutation of power to the motor windings 1A.

The outputs of the power switches are connected to the motor windings as is shown in FIGS. 1-4 with leads 31, 32 and 33 respectively connected to motor winding terminals A, B and C. A source of DC power is connected across leads 34 and 35. Lead 34 is denoted as motor voltage supply and lead 35 is denoted as motor voltage return. Conductor 36 distributes the voltage of lead 34 to the power switches 25, 26 and 27. Conductor 37 distributes the voltage of lead 35 to the power switches 28, 29 and 30.

The power switches 25, 26, 27, 28, 29 and 30 are preferably implemented by power transistors which may be either of the MOSFET (metal oxide semiconductor field effect transistor) type or BJT (bipolar junction transistor) type. In addition to the transistor itself, each power switch 25, 26, 27, 28, 29 and 30 will also be comprised of appropriate bias circuitry, predriver circuitry and power transistor protection circuitry.

Depending on the characteristics of the type of power switch 25, 26, 27, 28, 29 and 30 that is utilized, it is sometimes advantageous to provide some means of current limiting within the power source connected to leads 34 and 35. By way of example, one or more resistors in series with the power source may be employed to provide current limiting. It is sometimes advantageous to switch out or shunt one or more of such current limiting resistors at motor speeds above a certain predetermined speed value. The phase steering logic provides a digital signal output 38 which may be utilized to control a power switch to accomplish the switching out or shunting of such a current limiting resistor.

It will be recognized that the elements discussed thus far are common to typical electronically commutated motors. The present invention is directed to a control system for use with the aforedescribed elements for controlling the speed of the rotor 1B. Briefly, the control system includes means for measuring rotor speed by counting clock pulses, comparing the measured speed against a set-point, and controlling the phase steering logic 18 to energize the motor windings if the measured speed is too slow.

The control system utilizes an oscillator 39 which supplies an output signal 40 (e.g. 12 MHz) which is used indirectly to measure the speed of rotor 1B. In order to achieve a high precision of speed measurement, the oscillator 39 preferably comprises a crystal oscillator to assure the frequency accuracy and stability of output signal 40.

The output signal 40 from oscillator 39 is applied as an input to a clock countdown counter 41, which acts as a frequency divider. Several output signals are provided by clock countdown counter 41 and the frequency of each output and the necessary related division ratio is chosen at the time of design and construction of the control system. The output signals of clock countdown counter 41 function to provide clocking signal means in various other portions of the invention as will be described hereinafter.

The output signals of clock countdown counter 41 are output 42 (applicable to FIGS. 1-4), outputs 43 and 44 (applicable only to FIGS. 3 and 4), and outputs 45 and 46 (applicable to FIGS. 1-4). Output 46 is the lowest frequency signal output from the counter 41 and the other outputs are usually chosen to be higher frequencies than output 46.

The output signal 10 of signal conditioning circuit 6 is also applied as an input to sensor signal counter 47, which acts as a frequency divider. The purpose of sensor signal counter 47 is to provide a digital signal output 48 which has one and only one transition of a particular polarity per revolution of the motor rotor 1B. By way of example for the situation of an eight pole motor having four sensors, a sensor signal counter 47 comprised of two flip-flops connected as a divide by four ripple binary counter will produce one and only one transition of a positive going polarity per revolution of the motor rotor 1B.

Figure 6:
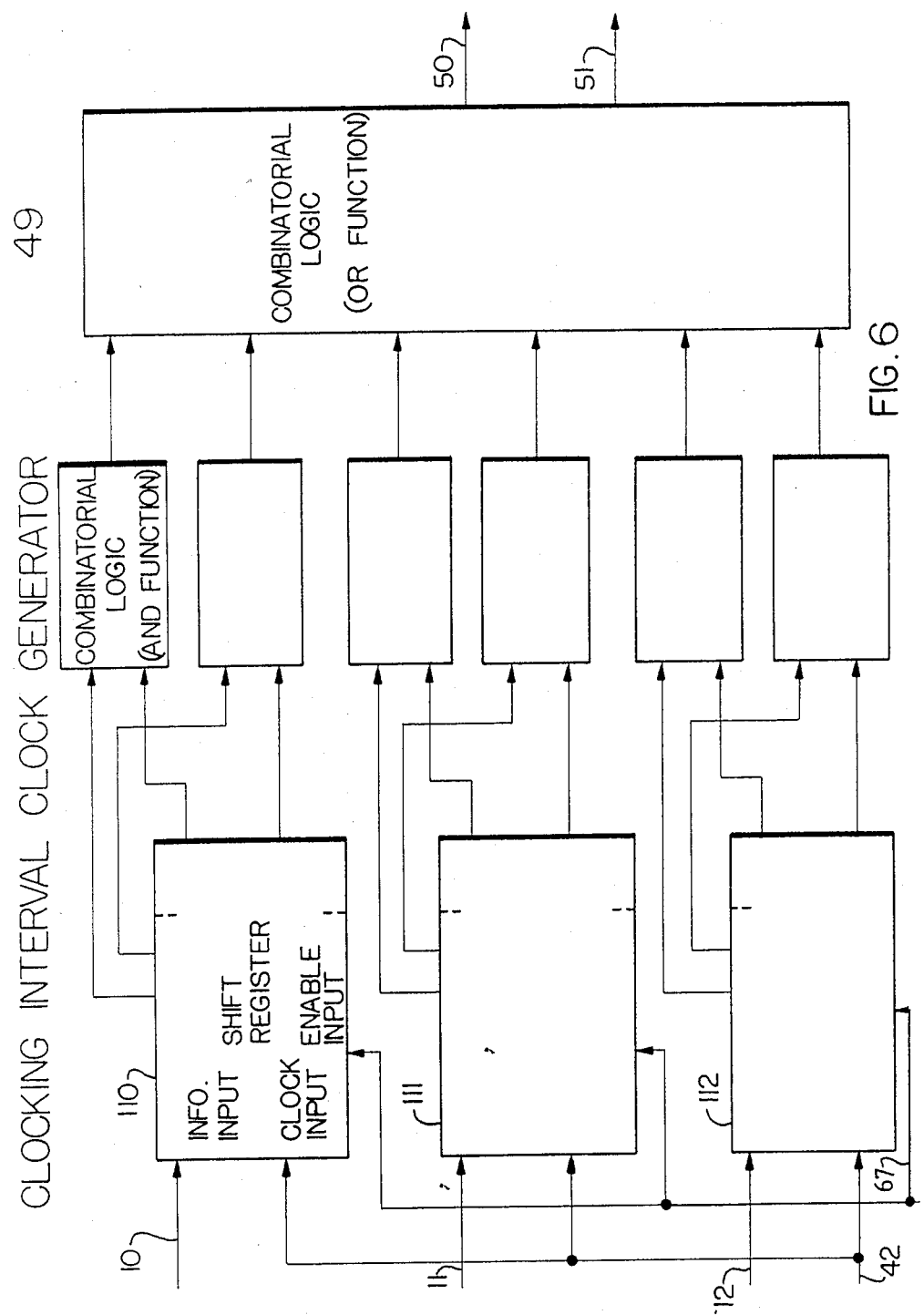
FIG. 6 is a block diagram of the clocking interval clock generator 49 utilized in the control system embodiments of FIGS. 1–4.

The clocking-interval clock generator 49 (FIG. 6) is comprised of digital storage elements, such as flip-flops, and combinatorial logic implemented with logic gates. One of the inputs to the clocking-interval clock generator 49 is the stable frequency clock 42 from the clock countdown counter 41. The clocking-interval clock generator 49 also receives as inputs the signals that indicate the rotor 1B position; i.e. signals 10, 11, 12 (FIG. 1) and 15, 16, 17 (FIGS. 2–4).

The clocking-interval clock generator 49 functions as three edge detectors which detect the edges (changes of logic level state) of the three input signals that indicate the rotor 1B position. The flip-flops (not shown) within the clocking-interval clock generator 49 are preferably connected to form three separate shift registers 110, 111, 112, (FIG. 6) one for each of the input signals. The combinatorial logic within the clocking-interval clock generator 49 decodes the states of the shift registers and produces a pulse having a duration of one period of clock signal 42 for each edge that is detected. The resulting output signal 50 (FIG. 5) is a pulse train which has pulses synchronized with the waveforms that indicate the rotor 1B position. A logic complement of signal 50, output signal 51, is also produced by the same aforementioned combinatorial logic.

Figure 7:
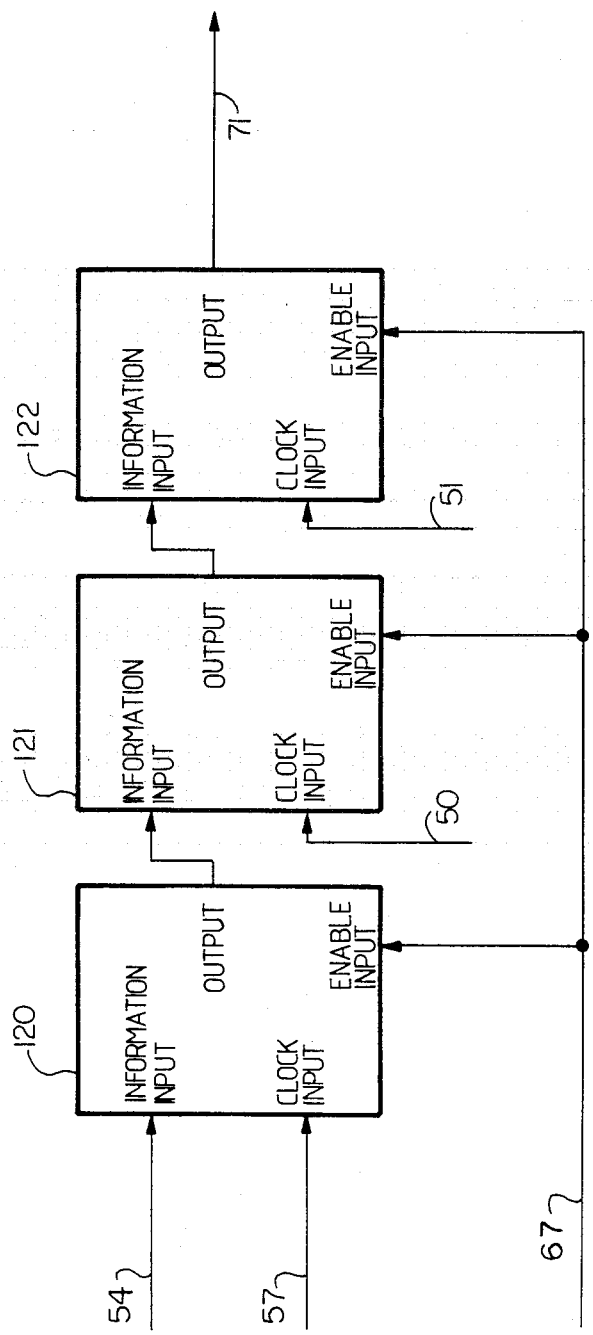
FIG. 7 is a block diagram of the holding and synchronizing register 52 utilized in the control system embodiments of FIGS. 1–4.

Holding and synchronizing register 52 (FIG. 7) is comprised of three binary stages 120, 121, 122 connected as a three stage shift register. Signals 50 and 51 from clock generator 49 are utilized to clock the second and third stages 121, 122. The detailed operation of the holding and synchronizing register 52 will be discussed hereinafter.

The speed detection counter and logic circuits 53 function to detect the speed of rotation of the rotor 1B and/or the attached load. More specifically, the objective is to provide a single digital output signal 54, having only two logic level states indicating that the speed was above or below a particular set-point value for each speed measurement cycle (to be described in more detail later). The speed detection counter and logic circuits 53 is comprised of storage elements, such as flip-flops, and combinatorial logic implemented with logic gates.

The speed detection counter portion of element 53 is comprised of flip-flops connected as a ripple binary counter having the capability to be parallel loaded (asynchronously set or cleared) with an initial count value. The digital output signal 54 is derived from the last stage of the counter (the most significant bit) which is preferably of the type that locks in the logic one state and does not rollover (count beyond the logic one state).

The count gate register and logic circuits 55 is comprised of a count gate register formed of storage elements, such as flip-flops, connected as a shift register and a combinatorial logic portion implemented with logic gates. The objective of the count gate register and logic circuits 55 is to establish a speed measurement cycle and provide a sequence of timing pulses within each measurement cycle at which certain actions occur.

Briefly, a logic level signal (48 in FIGS. 1 and 2 and 83 in FIGS. 3 and 4) applied to the input of circuit 55 is propagated through the shift register. The time duration utilized for each speed measuement cycle is determined by the period of the signal propagated through the register. The states of the circuit 55 shift register are decoded by combinatorial logic within circuit 55 and yield timing pulses which are used to trigger the events that perform a speed measurement cycle.

More particularly, the timing pulses output from the count gate register and logic circuits 55 include the (1) set stop speed count flip-flop 56, (2) transfer count 57, (3) logic complement of the transfer count 58, (4) reset detection counter 59, (5) clock stop speed count flip-flop 60.

The stop speed count flip-flop 61 is a single flip-flop closely associated with the speed detection counter and logic circuits 53. Two of the inputs to the flip-flop 61 are the set stop speed count flip-flop (pulse) 56 which sets the flip-flop and the clock stop speed count flip-flop (pulse) 60 which clocks a zero into the flip-flop.

The partial speed detection counter 62 is comprised of storage elements, such as flip-flops, and combinatorial logic implemented with a single logic gate. The flip-flops in the counter 62 are connected as a ripple binary counter whose last stage (the most significant bit) preferably locks in the logic one state and does not rollover (count beyond the logic one state). The output signal 63 and its complement 64 of the partial speed detection counter 62 are taken directly from the outputs of the last stage (most significant bit).

Signals 54 and 58 are applied as inputs to a single logic gate within the partial speed detection counter 62 and the result of said combination causes counts to be counted in the counter portion of element 62.

The set-point logic 65 is comprised of combinatorial logic implemented with logic gates. Signals 63 and 64 are applied as inputs to the combinatorial logic of (set-point logic) 65.

The set-point logic 65 influences the initial count value that is parallel loaded into the speed detection counter portion of element 53. For start-up of the motor 1, prior to detection of partial speed by the partial speed detection counter 62, only the partial speed (count) value is loaded as a result of the states of signals 63 and 64 and the combinatorial effects of the set-point logic 65. After detection of partial speed by the partial speed detection counter 62, then only the normal speed (count) value is loaded into element 53 as a result of the states of signals 63 and 64 and the combinatorial effects of the set-point logic 65.

The "motor on" digital signal applied to the lead 66 provides a means of enabling the motor 1 to be energized (on) or deenergized (off) according to the state of said signal. The signal 67 from lead 66 is applied to elements 41, 68, 55, 69, 61, 53, 62, 47, 49, 52 and 18. For the situation where the motor is to be off (deenergized), the state of signal 67 causes all flip-flops in elements 41, 68, 55, 61, 62, 47, 49 and 52 to be cleared and held cleared, the set-point logic 65 to be enabled and the partial speed (count) value to tbe loaded into the counter portion of element 53. Also for the situation where the motor is to be off, the state of signal 67 causes all flip-flops in element 69 (ignore count register) to be present and held preset.

Signal 64 is also applied as an input to the phase steering logic 18 wherein it is applied to an input of a single logic gate and combined with signal 67 which produces the aforementioned signal 38.

The output signal 46 of clock countdown counter 41 is applied as a clocking input to the start-up flip-flop 68. Start-up flip-flop 68 is comprised of only a single digital storage element which is connected such that it can be clocked to the logic one state but additional clocking will not clock it back to the logic zero state. Thus the flip-flop 68 can only achieve the logic zero state as a result of the (motor off) state of signal 67.

An output signal 70 from flip-flop 68 is applied as an input to the phase steering logic 18 and logically combined with other signals to cause the motor to not be energized until after the start-up flip-flop 68 becomes one-set.

Signals 54 and 57 are applied as inputs to the holding and synchronizing register 52 (FIG. 7) wherein they are utilized as the information signal input and clock input, respectively, to the first stage flip-flop 120 of the shift register, for each and every pulse of signal 57, the logic level state of signal 54 is clocked into flip-flop 120.

It should be recalled that digital signal 54 has only two logic levels which respectively indicate that the rotor speed is (1) above or (2) below a particular setpoint value for each speed measurement cycle. After completion of a measurement cycle, signal 57 will clock the state of signal 54 into flip-flop 120, where that state will be held until the next pulse of signal 57. The pulses 50 and 51 will subsequently shift the state held in flip-flop 120 through the second and third stages 121, 122 of the holding and synchronizing register 52. The output of the third stage 122 is a binary speed control digital signal 71 that is fully synchronized with the rotor 1B position and the normal commutation interval of motor 1.

The output signal 71 from the flip-flop 122 is applied as an input to phase steering logic 18, wherein it establishes control, by causing a particular phase to be energized according to its state and the phase steering effect of element 18.

The ignore count register 69 is comprised of storage elements, such as flip-flops, connected as a serial two stage shift register, which has as an input a constant zero logic level. Both stages of the ignore count register 69 are clocked by signal 59, the same signal which enables reloading of the speed detection counter portion of element 53. The output of the last stage of the ignore count register is signal 72, which is applied as an input to the combinatorial logic portion of element 55. The purpose of the ignore count register 69 is to inhibit pulse signals 57 and 58 for only the first two speed measurement cycles occurring after the ignore count register 69 is preset. This avoids utilizing any erroneous speed count results that may exist immediately after certain events, which are also employed to cause presetting of ignore count register 69.

The same signal 45 that is counted by the speed detection counter 53 (to be described in more detail hereinafter), is preferably buffered within element 53 and then fed as signal 73 to the count gate register 55, to provide the clocking signal for all stages of the register therein. This arrangement provides a clock signal, for the count gate register 55, which is correctly phased and synchronous with the same signal that is counted by the speed detection counter 53.

One object of the invention is to provide a means whereby a speed control system in accordance with the invention can be configured, if desired, to provide multiple (e.g. two) different modes of speed sensing and to change from one mode to the other without loss of control or the generation of undesired switching transients. Such a dual mode configuration is shown in FIGS. 3 and 4. A related object of the invention is to provide for a relatively simple circuit in its fundamental form when said dual mode feature is not required, but yet provide a means for readily adding additional selectable speed sensing modes when desired. FIGS. 1 and 2 are exemplary of such single mode configurations Now with reference specifically to FIGS. 1 and 2, clock signal 45 is applied directly to the speed detection counter circuits 53 wherein it is counted during each speed measurement cycle to measure the duration of a single rotor rotation.

Signal 48 is applied directly to the count gate register and logic circuits 55 wherein it is propagated through the count gate register portion of element 55 during each measurement cycle. In the simple configuration as shown in FIGS. 1 and 2, only one mode of speed sensing (specifically from the sensors 1C, 1D, 1E in proximity of rotor 1B) is possible. To provide two different modes of speed sensing, e.g. coarse and fine, and to change from one mode to the other, additional elements must be added with respect to that shown in FIGS. 1 and 2.

Now with reference specifically to FIGS. 3 and 4 elements 74 and 75 are added to provide for the fine speed sensing mode. Element 74 is attached to and rotates with, shaft 76 of rotor 1B and carries multiple uniformly spaced index marks thereon which can be sensed by element 75. By way of example, element 74 comprises a magnetic recording disk with a prerecorded magnetic pattern and element 75 comprises a magnetic playback head. By way of yet another example, element 74 could be a slotted ferrous disk and element 75 could be a magnetically biased Hall Effect sensor.

The signal 77 derived from the output of element 75 is applied as an input to element 78. By way of example, element 78 comprises a demodulator channel for the situation where element 74 comprises a magnetic recording disk and element 75 comprises a magnetic playback head. By way of yet another example, element 78 could be a signal conditioner for the situation where element 74 comprises a slotted ferrous disk and element 75 comprises a Hall Effect sensor.

Element 78 converts and/or conditions signal 77 and outputs a digital signal 79 comprising a pulse train having a pulse for each index mark of element 74.

Signal 79 is applied as an input to a countdown counter 80 which functions as a frequency divider. The countdown counter 80 is comprised of storage elements, such as flip-flops, connected as a binary counter. The number of stages chosen for counter 80 depends on the repetition rate of signal 79, the desired number of speed measurement cycles (samples) per rotor revolution, the available frequency of signal 43 and the desired speed measurement accuracy.

Signals 48 and 81 are applied as inputs to a multiplexer 82, wherein one or the other of the signals is selected as a multiplexer output signal 83, which is then applied as an input to the count gate register and logic circuits 55. Within the count gate register and logic circuits 55, signal 83 is utilized as the signal which is propagated through the shift register portion of element 55 during a measurement cycle.

Signals 45 and 43 are also applied as inputs to the multiplexer 82, wherein one or the other of the signals is selected as a multiplexer output signal 84, which is then applied as an input to the speed detection counter and logic circuits 53. Within the speed detection counter and logic circuits 53, signal 84 is utilized as the clock which the speed detection counter portion of element 53 counts during a measurement cycle.

An operating mode change sequencer and operating mode logic circuits (hereinafter referred to as mode change sequencer) 85 coordinates the two different speed sense operating modes and the changeover between them. Mode change sequencer 85 is comprised of storage elements, such as flip-flops, and combinatorial logic implemented with logic gates. A state-machine type of sequencer and a synchronizer are implemented within the mode change sequencer 85.

A digital command signal applied to lead 86 is coupled as an input 87 to mode change sequencer 85 to command the desired speed sense operating mode To assist in understanding the operation of the control systems of FIGS. 3 and 4, first assume that the two different operating modes are respectively identified as Mode-0 in which rotor speed is sensed from sensor 1C and Mode-1 in which rotor speed is sensed from element 74. Briefly, Mode-0 can be considered the coarse mode characterized by only one measurement cycle per rotor revolution and generally looser tolerance. In contrast, Mode-1 can be considered the fine mode characterized by multiple measurement cycles per rotor revolution and tighter speed control tolerance.

Signal 67 is applied as an input to mode change sequencer 85. For the situation where the motor is to be off (deenergized), the state of signal 67 causes all flip-flops in the mode change sequencer 85 to be cleared and held cleared. For the situation where the motor is to be on (energized), the state of signal 67 causes all flip-flops in mode change sequencer 85 to be released for clocking if the state of signal 87 commands Mode-1.

Signal 44 from counter 41 is applied as an input to the mode change sequencer 85 and it is utilized as a clocking signal for purposes of synchronizing and pulse generation.

Signal 81 from counter 80 is also applied as an input to the mode change sequencer 85, wherein it is utilized as a clocking signal for purposes of synchronizing the request for a mode change resulting from a change of logic level of signal 87. Note that in the absence of the correct pulsing of signal 81, such as might occur, by way of example, due to a failure of any of the elements 74, 75 and 78, then a change to Mode-1 would not be initiated, because a clocking signal is required to enable the mode change request.

In order to properly synchronize the actions involved in changing between Mode-0 and Mode-1, a synchronizing pulse signal 88 is generated at an appropriate time by count gate register and logic circuits 55. Signal 88 is applied as an input to mode change sequencer 85, wherein it is utilized to clock a flip-flop which initiates the actions involved in changing between Mode-0 and Mode-1, if a mode change request is pending.

Mode change sequencer 85 combines signals 67 and 87 in combinatorial logic to generate output signal 89. Signal 89 is used to permit the flip-flops within mode change sequencer 85 to be released for clocking only if the state of signal 87 commands Mode-1. Signal 89 is also applied as an input to countdown counter 80 which causes the flip-flops within countdown counter 80 to be released for counting (clocking) only if the state of signal 87 commands Mode-1.

Mode change sequencer 85 generates two digital output signals 90, 91 which cause actions that affect the changeover between operating modes. Signal 90 is a pulse which asserts that a mode changeover is underway and is applied to multiplexer 82, the speed detection counter and logic circuits 53, the ignore count register 69 and the count gate register and logic circuits 55.

When signal 90 asserts that a mode changeover is underway, it causes the speed detection counter portion of element 53 to be loaded with and held at the initial count value established by the set-point logic, causes the ignore count register 69 to be preset to a logic one state, and causes the count gate register portion of element 55 to be cleared and held cleared, during the duration of the pulse of signal 90.

Multiplexer 82 is comprised of combinatorial logic and produces output signals 83 and 84 only when signal 90 from mode change sequencer 85 is not in the state indicating that a mode change is underway.

Signal 91 identifies either Mode-0 or Mode-1 operation and is dependent on signal 87. When signal 91 is in the Mode-0 state, the multiplexer 82 selects signals 45 and 48 for output as signals 84 and 83, respectively. When signal 91 is in the Mode-1 state, the multiplexer 82 selects signals 43 and 81 for output as signals 84 and 83, respectively.

The operation of the control systems in accordance with the invention will now be described to facilitate a better understanding of the invention.

With reference to FIGS. 1-4, when the signal applied to lead 66 is first placed to a logic level corresponding to the motor on (energized) state, the start up flip-flop 68 and clock countdown counter 41 is released (from being held in a cleared state) by signal 67.

Since signal 46 is the lowest frequency signal output from clock countdown counter 41, an intentional time delay occurs before signal 46 clocks the start-up flip-flop to the logic one state. This time delay avoids erroneous motor starting at the time that power is first applied inasmuch as signal 70 is necessary to enable the motor to be energized.

After signal 46 clocks the start-up flip-flop to the one-set state, the partial speed detection counter 62 will produce signal 64 to override the effect of signal 71 within the phase steering logic 18. Thus the motor will be energized fully during all commutation intervals as it starts to rotate.

After the motor speed has increased above the partial speed (count) value established by the set-point logic 65, the partial speed detection counter 62 will reach full count and signals 63 and 64 will change state. Set-point logic 65 will then establish the set point value, the nominal speed value about which the speed of the motor will be controlled.

During each speed measurement cycle, as the relevant edge of the signal 83 in FIGS. 3 and 4 (signal 48 in FIGS. 1 and 2) propagates through the count gate (shift) register portion of element 55, the edge detection effect of the register and combinatorial logic causes pulses to be generated resulting in the following sequence of events:

1. Pulse signal 56 is issued forcing the stop speed count flip-flop 61 to one-set, causing the first stage counting in the speed detection counter portion of element 53 to be immediately inhibited.

2. A brief time delay occurs to allow for settling of the count in the speed detection counter portion of element 53.

3. Pulse signals 57 and 58 are issued. (This occurs only when the last stage of the ignore count register 69 has been previously clocked to a zero-set state, such as is assumed in this description). Signal 57 clocks the state of signal 54 into the first stage 120 of holding and synchronizing register 52. The state of signal 54 at that instant is the speed measurement result of the speed measurement cycle that has just been completed.

4. Another brief time delay occurs to provide for proper timing of pulses.

5. Pulse signal 59 is issued and the speed detection counter portion of element 53 is reloaded with the initial count value as established by the set-point logic 65. Also pulse signal 59 clocks ignore count register 69.

6. Signal (or pulse) 60 is issued and the stop speed count flip-flop 61 is clocked to the zero-set state which immediately permits counting to resume in the speed detection counter portion of element 53. At that instant, a new speed measurement cycle has begun.

As shown in FIGS. 1, 2 and 3, the set-point logic 65 is assumed to be hard wired and not capable of changing the set-point under external command. Rather, set-point logic 65 only has the capability to change the set-point according to the states of signals 63 and 64. Thus, only a single value for the partial speed (count) value or only a single value for the normal speed (count) value is selected according to the states of signals 63 and 64.

For certain applications of the invention, it is desirable that a means be provided to change the set-point, as for example, where it is desired to control the motor speed with respect to a plurality of nominal shaft speeds, the specific nominal speed value being selected by a microprocessor.

Now with reference to FIG. 4 only, an additional element, the change set-point circuit 92, is depicted. The change set-point circuit 92 provides means to change the set-point (initial count value) under command of external signals 93 applied to leads 94. Signals 95 transfer the appropriate states from the change set-point circuit 92 to the set-point logic 65.

The change set-point circuit 92 is comprised of storage elements and/or combinatorial logic. By way of example, the storage elements might be comprised of memory, such as read only memory (ROM) or random access memory (RAM) and the combinatorial logic might be implemented with logic gates.

A value for the partial speed (count) value or a value for the normal speed (count) value as furnished by the change set-point circuit 92 would be selected by the set-point logic according to the states of signals 63 and 64. This is analogous and similar to the operation of the set-point logic as previously described in connection with FIGS. 1–3. However, the actual value is established by the change set-point circuit 92.

Depending on the particular application of the invention and the type of implementation of the change set-point circuit 92, it may be desirable to use one or more of the signals already available within the invention to synchronize changes of the set-point; e.g. signals 57, 67, or 90.

Although particular embodiments of the invention have been illustrated and described, it is recognized that various modifications may readily occur to those skilled in the art which embody the basic teachings of the invention. It is accordingly intended that the appended claims be interpreted to cover such modifications.

For example only, it should be understood that the features of the embodiments of FIGS. 3 and 4 could readily be adapted to the situation of a motor having only three sensors like that shown in FIG. 1.

The invention is also applicable to motors having windings other than the delta winding illustrated. For example, a center-tapped star winding could be used and the power switches 25, 26 and 27 omitted. The center-tap of the star winding would be connected to conductor 36. The legs of the center-tapped star winding would be connected to power switches 28, 29 and 30 via leads 31, 32 and 33. Phase steering logic 18 would be correspondingly modified. If it was desired to avoid overlap-conduction of power switches 28, 29 and 30, then suitable signals for dealing with this could be derived by modification of the clocking interval clock generator 49 (for example, extending the length of the registers), extracting the appropriate signals from the modified clocking interval clock generator 49, and adding additional combinatorial logic to the phase steering logic 18 to accept the additional signals from the modified clocking interval clock generator 49.

The invention can also be applied to the simpler situation of two-phase motors. By way of example sensor 1E and 1F, signal conditioning circuit 8 and 9, four-to-three conversion logic 14, one phase of clocking interval clock generator 49 and some of the power switches 25, 26, 27, 28, 29 and 30 would be omitted as appropriate. Phase steering logic 18 would be correspondingly modified. If it was desired to avoid overlap-conduction of power switches or to phase shift one phase slightly, then suitable signals for dealing with this could be derived by modification of the clocking interval clock generator 49 (for example, extending the length of the registers), extracting the appropriate signals from the modified clocking interval clock generator 49, and adding additional combinatorial logic to the phase steering logic is to accept the additional signals from the modified clocking interval clock generator 49.

Similarly, the invention can also be applied to the more complex situation of motors having more than three phases. By way of example, additional sensors (similar to sensor 1F), additional signal conditioning circuits (similar to signal conditioning circuit 9), and some power switches (similar to power switches 27 and 30) would be added as appropriate with the depicted elements being appropriately modified.

I claim:

1. In combination with an electronically commutated motor having a plurality of stator windings, a rotor mounted for rotation with respect to said windings, a plurality of switching means for individually energizing said windings, and phase steering means responsive to the rotational position of said rotor and operable to close said switching means to sequentially energize said windings at appropriate times, a system for controlling the speed of said rotor comprising:

means for defining successive speed measurement cycles;

means for defining a speed set-point;

means for measuring rotor speed during each successive speed measurement cycle;

means for comparing each rotor speed measurement with said speed set-point for producing a speed state signal having a first state if said measured rotor speed exceeds said set-point and a second state if said measured rotor speed is less than said set-point;

means for enabling said phase steering means to close said switching means in response to said speed state signal second state;

said means for measuring rotor speed including a source of clock signals; and
    means for counting the clock signals occurring within a predefined portion of each measurement cycle.

2. The combination of claim 1 wherein said means for defining speed measurement cycles includes means for generating a cycle start signal for each predefined increment of rotor rotation.

3. The combination of claim 2 wherein said means for defining speed measurement cycles further includes timing circuit means for initiating a measurement cycle time interval in response to each cycle start signal.

4. The combination of claim 3 including a source of clock pulses; and wherein
    said timing circuit means includes count means responsive to said clock pulses for defining said measurement cycle time interval.

5. The combination of claim 4 wherein said timing circuit count means includes means for producing a sequence of control signals during each measurement cycle; and wherein
    said means for measuring rotor speed includes means for counting the clock pulses occurring within a portion of each measurement cycle defined by said control signals.

6. The combination of claim 1 including means responsive to external control for selectively changing said speed set-point.

7. The combination of claim 5 wherein said timing circuit means includes a shift register having a first stage, a last stage, and a plurality of intermediate stages; and including
    means for entering said start signal into said first stage for shifting through said intermediate stages to said last stage.

8. In combination with an electronically commutated motor having a plurality of stator windings, a rotor mounted for rotation with respect to said windings, a plurality of switching means for individually energizing said windings, and phase steering means responsive to the rotational position of said rotor and operable to close said switching means to sequentially energize said windings at appropriate times, a system for controlling the speed of said rotor comprising:
    means for defining successive speed measurement cycles;
    means for defining a speed set-point;
    means for measuring rotor speed during each successive speed measurement cycle;
    means for comparing each rotor speed measurement with said speed set-point for producing a speed state signal having a first state if said measured rotor speed exceeds said set-point and a second state if said measured rotor speed is less than said set-point;
    means for enabling said phase steering means to close said switching means in response to said speed state signal second state;
    synchronizing means for applying said speed state signal to said phase steering means;
    said synchronizing means including means for moitoring the position of said rotor for applying said speed state signal to said phase steering means at the appropriate time.

9. In combination with an electronically commutated motor having a plurality of stator windings, a rotor mounted for rotation with respect to said windings, a plurality of switching means for individually energizing said windings, and phase steering means responsive to the rotational position of said rotor and operable to close said switching means to sequentially energize said windings at appropriate times, a system for controlling the speed of said rotor comprising:
    means for defining successive speed measurement cycles;
    means for defining a speed set-point;
    means for measuring rotor speed during each successive speed measurement cycle;
    means for comparing each rotor speed measurement with said speed set-point for producing a speed state signal having a first state if said measured rotor speed exceeds said set-point and a second state if said measured rotor speed is less than said set-point;
    means for enabling said phase steering means to close said switching means in response to said speed state signal second state;
    said means for measuring rotor speed including first and second sets of index marks driven by said rotor, said second set including a greater number of index marks per rotor revolution than said first set;
    means for selecting either said first or second set of index marks; and
    means for initiating a speed measurement cycle in response to each index mark in the selected set.

10. The combination of claim 9 including a source of first and second trains of clock pulses, said second train having a greater frequency than said first train; and wherein
    said means for initiating a speed measurement cycle includes timing circuit means for counting clock pulses of said first train when said first index mark set is selected and clock pulses of said second train when said second index mark set is selected to define a measurment cycle time interval.

11. The combination of claim 10 wherein said timing circuit means includes means for producing a sequence of control signals during each measurement cycle; and wherein
    said means for measuring rotor speed includes means for counting clock pulses of said first train when said first index mark set is selected and clock pulses of said second train when said second index mark set is selected within a defined portion of said measurement cycle time interval.

12. A method of controlling the rotor speed of an electronically commutated motor having a plurality of stator windings, a rotor mounted for rotation with respect to said windings, a plurality of switching means for individually energizing said windings, and phase steering means responsive to the rotational position of said rotor and operable to close said switching means to sequentially energize said windings at appropriate times, comprising:
    monitoring the rotational position of said rotor and initiating a speed measurement cycle at the same position during each rotor rotation;
    defining a speed set-point;
    measuring the speed of said rotor during each measurement cycle;
    comparing said measured rotor speed with said speed set-point to produce a speed increase command if said measured speed is less than said speed set-point; and enabling said phase steering means to close said switching means in response to said speed increase command.

13. The method of claim 12 wherein said step of measuring the speed of said rotor includes the step of counting uniformly spaced clock pulses during a predefined portion of each speed measurement cycle.

14. The method of claim 12 wherein said step of enabling said phase steering means includes synchronizing said enabling step to occur when said rotor is at an appropriate position.

* * * * *